United States Patent
Stathakis, Jr.

(10) Patent No.: US 11,414,142 B1
(45) Date of Patent: Aug. 16, 2022

(54) BATTERY-OPERATED ELECTRIC HYDROSTATIC UTILITY TRACTOR

(71) Applicant: George James Stathakis, Jr., New York, NY (US)

(72) Inventor: George James Stathakis, Jr., New York, NY (US)

( * ) Notice: Subject to any disclaimer, the term of this patent is extended or adjusted under 35 U.S.C. 154(b) by 0 days.

(21) Appl. No.: 17/410,187

(22) Filed: Aug. 24, 2021

(51) Int. Cl.
*B62D 49/00* (2006.01)
*A01B 51/02* (2006.01)
*B60L 50/52* (2019.01)

(52) U.S. Cl.
CPC ............ *B62D 49/00* (2013.01); *A01B 51/026* (2013.01); *B60L 50/52* (2019.02); *B60W 2300/152* (2013.01)

(58) Field of Classification Search
CPC ...................................................... B62D 49/00
See application file for complete search history.

(56) References Cited

U.S. PATENT DOCUMENTS

| | | | |
|---|---|---|---|
| 3,990,723 A | 11/1976 | Sessions | |
| 4,862,767 A | 9/1989 | Hauser | |
| 4,897,013 A | 1/1990 | Thompson et al. | |
| 5,581,986 A | 12/1996 | Calver | |
| 5,890,545 A | 4/1999 | Smith et al. | |
| 6,729,114 B2 * | 5/2004 | Fillman | B60L 15/20 56/10.6 |
| 8,616,310 B2 * | 12/2013 | Lopez | B60L 8/003 180/53.3 |
| 8,863,485 B2 | 10/2014 | Pitcel et al. | |
| 9,033,077 B2 * | 5/2015 | Kurkinen | B60K 17/10 417/364 |
| 9,272,636 B2 | 3/2016 | Ichikawa | |
| 9,408,343 B2 | 8/2016 | Wyatt et al. | |
| 9,917,460 B2 | 3/2018 | Koenen et al. | |
| 9,981,665 B2 * | 5/2018 | Rekow | B60W 10/115 |
| 10,058,031 B1 * | 8/2018 | Brown | B60R 16/0231 |
| 10,709,060 B2 | 7/2020 | Simmons et al. | |
| 10,925,216 B1 * | 2/2021 | Brown | B60K 17/14 |
| 10,980,173 B2 | 4/2021 | Becke et al. | |
| 2006/0289179 A1 | 12/2006 | Irvin et al. | |
| 2012/0061158 A1 | 3/2012 | Gotou | |
| 2012/0217074 A1 | 8/2012 | Rudinec | |

(Continued)

*Primary Examiner* — Michael A Berns
(74) *Attorney, Agent, or Firm* — Dunlap Bennett & Ludwig, PLLC

(57) ABSTRACT

A battery-operated electric hydrostatic utility tractor is disclosed. The utility tractor is a zero-emissions and more capable of powering work attachments to many chores. The tractor frame is supported by ground wheels and is configured to operative couple work accessories. The work accessory has a power connection to couple with an electric source or a pressurized hydraulic fluid carried by the utility tractor. A hydrostatic pump is configured to produce the source of pressurized hydraulic fluid and includes an integrally contained transaxle for selectively providing a hydraulic motive force to a driveshaft for each of an opposed pair of drive wheels. An electric motor has an output axially aligned with an input shaft of the hydrostatic pump, for developing the source of pressurized hydraulic fluid by the hydrostatic pump. A plurality of battery compartments are compartments configured to receive a rechargeable battery to provide the electric source.

9 Claims, 4 Drawing Sheets

(56) References Cited

U.S. PATENT DOCUMENTS

2019/0016397 A1    1/2019  Rempel
2019/0382005 A1*  12/2019  Nishi ................... B60W 30/09
2021/0037691 A1*  2/2021  Horsch ............... G05D 1/0223

* cited by examiner

BATTERY-OPERATED ELECTRIC HYDROSTATIC UTILITY TRACTOR

BACKGROUND OF THE INVENTION

The present invention relates to utility tractors, and more particularly to battery operated utility tractors.

Battery powered utility tractors have become desirable for reducing emissions and reducing consumption of fossil fuels. However, other battery-operated utility tractors tend to be just a battery-operated riding lawn mower or are a device directed to performance of just one specific application. These vehicles are typically designed for efficiency of the electrical vehicle, rather than power for completing a variety of applications.

As can be seen, there is a need for an improved utility tractor that provides extreme toughness and durability plus the versality of adding attachments for completion of many tasks and chores such as lawn mowing, snow blowing, snow plowing, rototilling, road sweeper, all with electrically driven attachments.

SUMMARY OF THE INVENTION

In one aspect of the present invention, a utility tractor is disclosed. The utility tractor includes a tractor frame supported by a plurality of ground wheels. The tractor frame is configured to operatively couple a work accessory with the utility tractor. The work accessory having a power connection to couple with one or more of an electric source and a source of pressurized hydraulic fluid. A hydrostatic pump is configured to produce the source of pressurized hydraulic fluid. The hydrostatic pump includes an integrally contained transaxle for selectively providing a hydraulic motive force to a driveshaft for each of an opposed pair of drive wheels. An electric drive motor has an output axially aligned with an input shaft of the hydrostatic pump. The electric drive motor being operative for developing the source of pressurized hydraulic fluid by the hydrostatic pump. A plurality of battery compartments is disposed about the tractor frame. Each of the plurality of battery compartments are configured to receive a rechargeable battery pack to provide an electric source for the electric drive motor and an electric motor for the work accessory.

In some embodiments, an electrical controller is configured to selectively distribute the electric source between the electric drive motor and the work accessory.

In some embodiments, a hydraulically actuated steering linkage is coupled with the source of pressurized hydraulic fluid for turning a directional wheel via one of a steering wheel or a directional control lever.

In some embodiments, an external hydraulic connector is disposed at one of a front and a back of the tractor frame. The external hydraulic connector is configured to couple with a hydraulic connector of one or more hydraulically actuated work accessories.

In some embodiments, a hydraulic controller is provided for selectively distributing the source of pressurized hydraulic fluid to the hydraulically actuated steering linkage and one or more hydraulically actuated work accessories.

In other embodiments, an electrical connector is configured to electrically couple the electrical controller with an electrical motor for the work accessory.

In other embodiments, a battery cart is coupled to the one or more of a front and a back of the tractor frame. The battery cart is configured to receive a plurality of auxiliary rechargeable battery packs.

In yet other embodiments, a plurality of batteries is carried in the plurality of battery compartments and connected in series to drive the electric drive motor at a desired output voltage.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, embodiments of the present invention provide an improved utility tractor that provides extreme toughness and durability plus the versality of adding attachments for completion of many tasks and chores such as lawn mowing, snow blowing, snow plowing, rototilling, road sweeper, all with electrically driven attachments.

Figure 1:
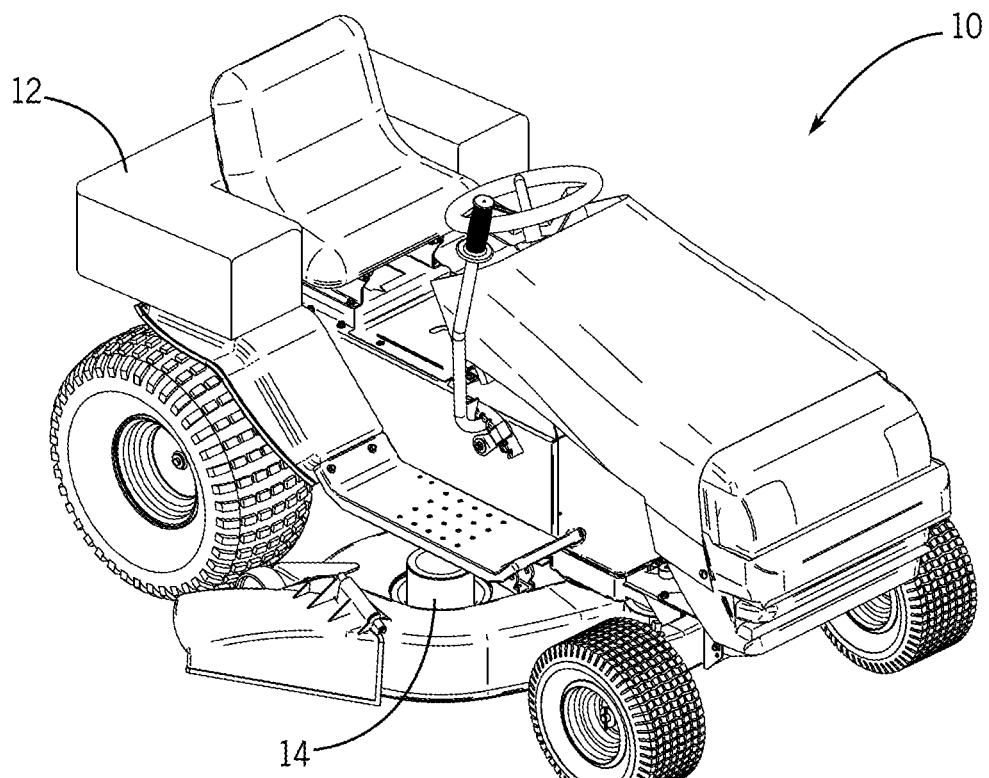
FIG. 1 is a top front perspective view of the battery-operated electric hydrostatic garden tractor invention.
Figure 2:
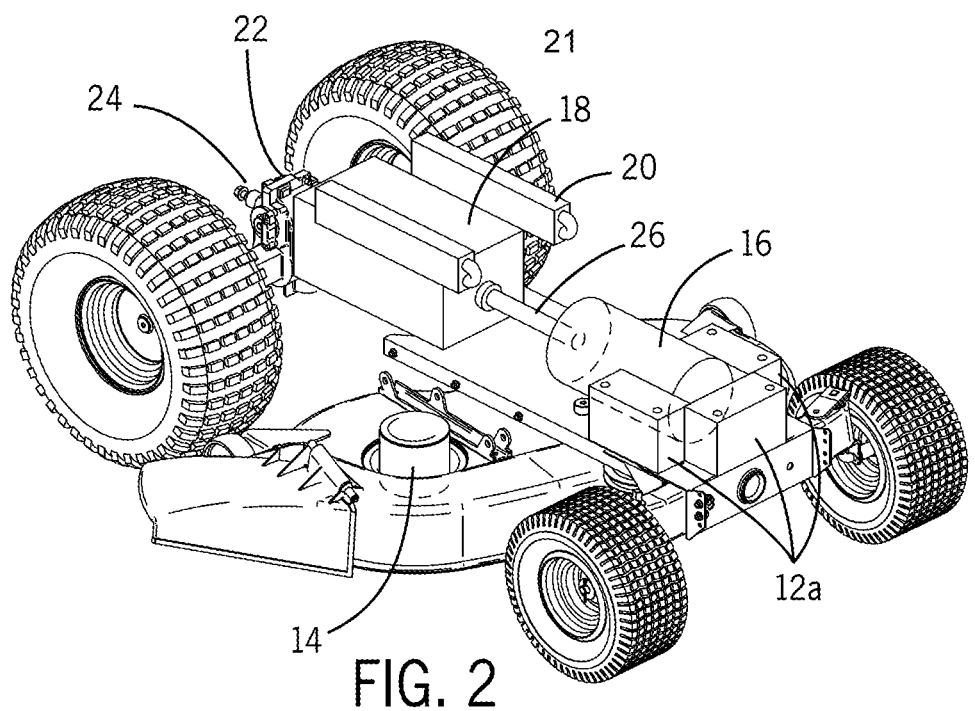
FIG. 2 is top front perspective view of the invention with the cover removed.
Figure 3:
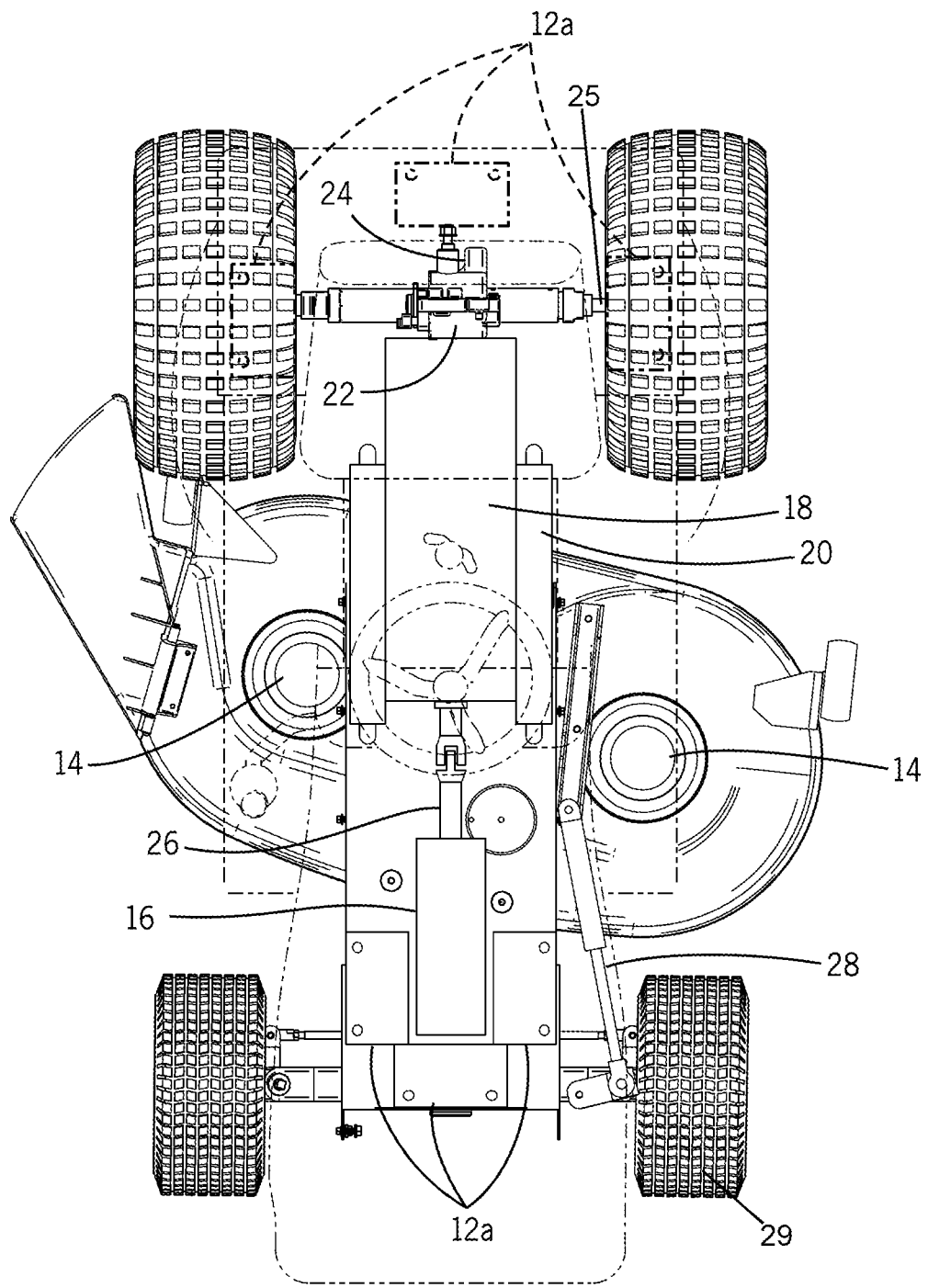
FIG. 3 is a top plan view of the invention.
Figure 4:
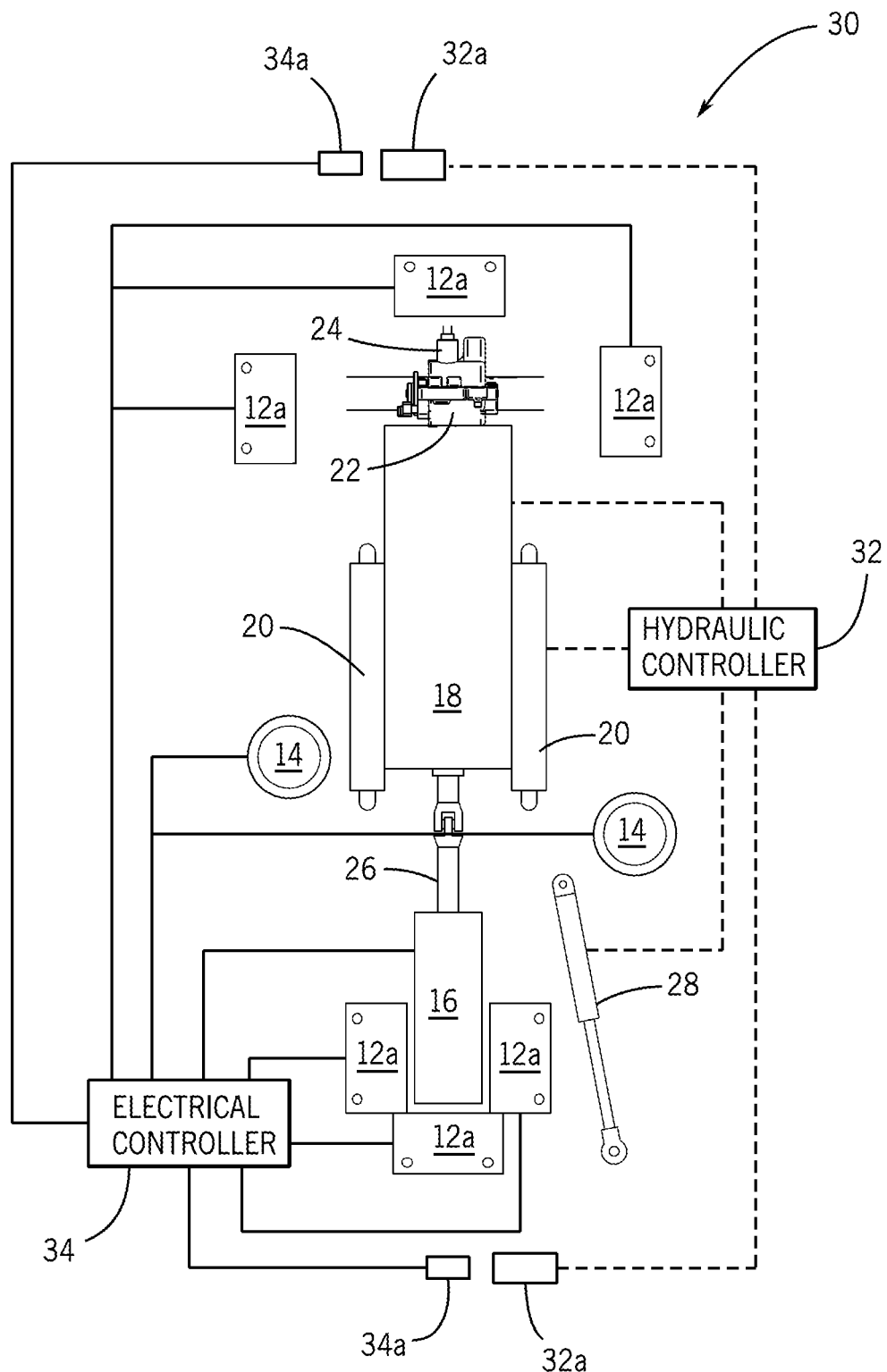
FIG. 4 is a top plan view of a schematic of the invention.
Figure 5:
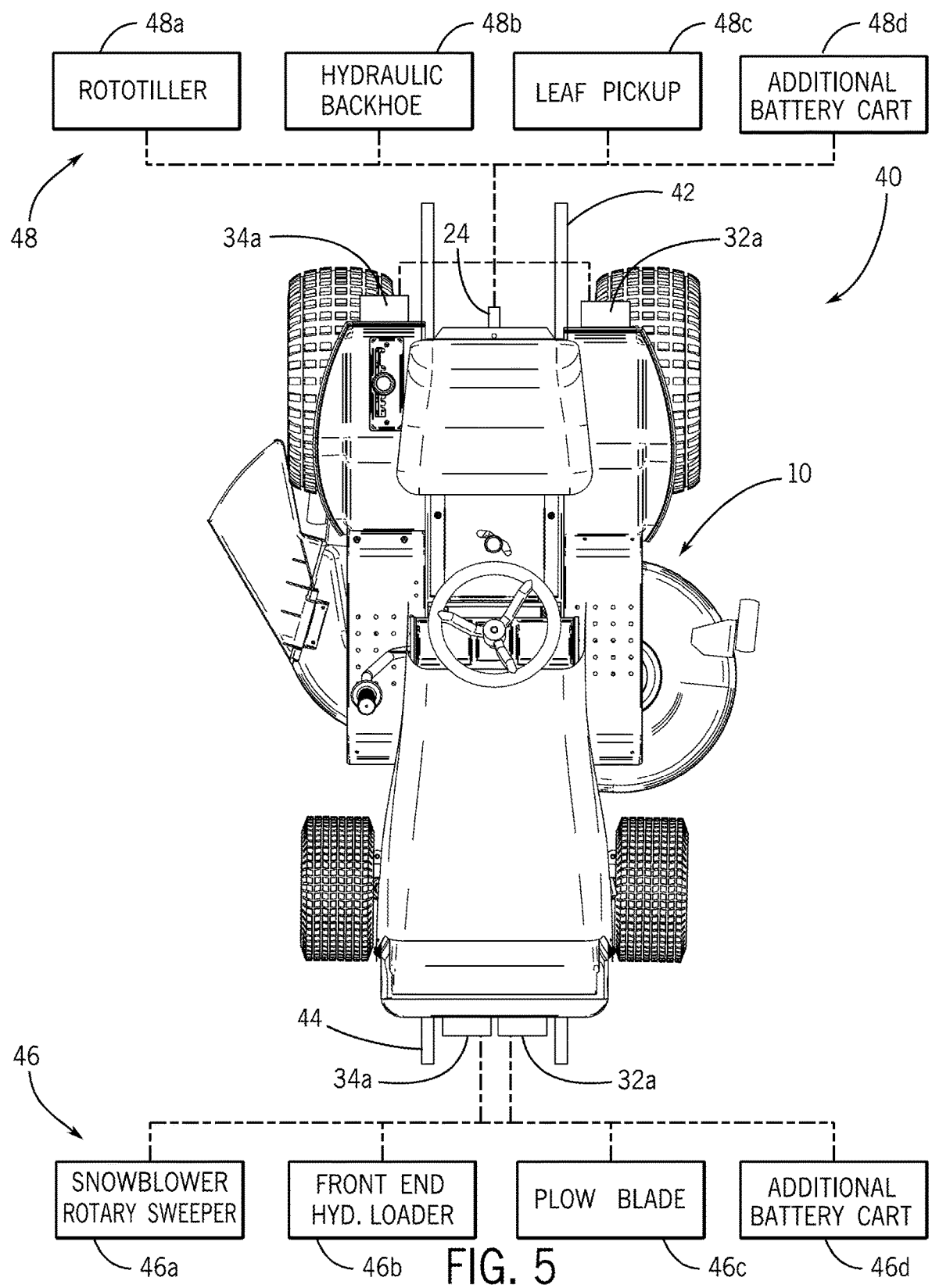
FIG. 5 is a top plan view schematically showing accessories for the invention.

As seen in reference to the drawings of FIGS. 1-5, an improved battery-operated utility tractor 10 is shown. The battery-operated utility tractor 10 includes a plurality of battery storage compartments 12. A work attachment 14, such as a mower deck, is configured to be mounted to the chassis of the battery-operated utility tractor 10. The plurality of battery storage compartments 12 may include an aft battery bank, that may be configured to surround a seat of the utility tractor 10. The aft battery bank 12 may have a protective cover to contain a plurality of rechargeable battery packs 12*a*. A forward battery bank may be contained within a forward motor enclosure of the utility tractor for operatively connecting additional rechargeable battery packs 12*a*. In a non-limiting example, the plurality of battery packs 12*a* may include 12-volt batteries connected in series to provide a 36-volt or 48 volt power source for the utility tractor 10 and work attachments 14.

The work attachment 14 includes an electric motor for independently driving the work attachment 14 from a motive force of the utility tractor 10. In the non-limiting embodiment shown, the work attachment 14 is a mower deck. The work attachment 14 may include a plurality of motors for driving a work tool, such as a mower blade. This configuration eliminates the power transmission elements of a conventional utility tractor, such as pulleys and belts, gearboxes, and the like, that add to the weight, complexity, and maintenance of the conventional utility tractor.

The utility tractor 10 includes a motor compartment containing an electric drive motor 16. Preferably, the electric motor 16 has an output shaft 26 that is axially aligned with a hydrostatic pump 18. This configuration allows for a direct drive of the hydrostatic pump 18 and eliminates the need for pulleys, belts, and gearboxes associated with other conventional gas and battery-operated tractors. The electric motor 16 operates the hydrostatic pump 18 to circulate a source of pressurized hydraulic fluid to provide a motive force to at least one drive wheel 21 of the utility tractor. A hydrostatic oil cooler 20 is provided for cooling of the hydraulic fluid carried in the system.

The motive force to the at least one drive wheel 21 is provided by hydraulic actuation of the hydrostatic pump 18. The hydrostatic pump 18 includes an integrally contained transaxle for selectively providing a motive force to a driveshaft 25 for each of the at least one drive wheel 21. Preferably, the at least one drive wheel 21 are a pair of drive wheels 21 disposed on opposite sides of the utility tractor 10.

A gearbox 22 is provided in line with the hydrostatic pump 18 and is selectively engageable to drive a power takeoff (PTO) shaft 24 for operating other work attachments 14 that may be operatively coupled with the utility tractor 10.

A steering linkage 28 may be hydraulically operated by hydraulic pressure from the hydrostatic pump 18, for turning of directional wheels 29 via a steering wheel or directional control levers.

The battery-operated utility tractor 10 may include a hydraulic controller 32 for selectively routing hydraulic pressure from the hydrostatic pump 18 where it may be needed for controlling a work task. The hydraulic pressure may be directed to an external hydraulic connection 32a for operation of work attachments 14 such as a hydraulic backhoe 48b, a log splitter (not shown), and the like. An electrical controller 34 is provided for controlling the distribution of the electrical charge carried by the plurality of battery packs 12a. Electrical connectors 34a provide for electrical coupling and directing the electrical charge to the drive motor 16 or the one or more motors coupled to the work attachment 14.

The utility tractor 10 provides for attachment of a plurality of work attachments 14. The rear end of the utility tractor 10 may include a three-point hitch 42 for coupling with a variety of implements. Non-limiting embodiments may include a rototiller 48a, a hydraulic backhoe 48b, a leaf pickup apparatus 48c, and an additional battery cart 48d. A forward attachment point 44 allows for connection to a plurality of frontally attached work attachments, such as a snowblower or rotary sweeper 46a, a front-end hydraulic loader 46b, a plow blade 46c, and an additional battery cart 46d.

In a preferred embodiment, the utility tractor 10 is driven by 2 non removable (seat and front around drive motor) or 2 external (removable battery carts) battery banks which are 36 volts or 48 volt (depending on 3 batteries of 4 in each cart) each and can be switch on off as needed via the electrical controller 34. These batterie banks drive the electric drive motor 16 which drives the hydraulic pump-hydrostatic system 18. The hydro system 18 drives the forward and reverse motion of the tractor 10 with a 2-speed transmission and a full variable speed control. The electric drive motor 16 drives the pumps by motor controller allowing a variable speed input for different demands and efficiency. An onboard 36-volt charger may be provided to charge all 3 or 4 banks or each battery pack 12a may be charged independently in 2-10 hours, depending on type of batteries used. (lithium Ion or AGM lead acid)

The work attachments 14 mower, snowblower and sweeper, and rototiller may utilize use another 36 volt motor to drive that system and be fully electric, with zero emissions using one of the 3 battery banks to power it for 1-2 hrs. The snowplow, and other hydraulically powered work attachments 14 may use the main drive hydro system to power the wheels for forward or reverse movement. The hydro pump 18 can also power the back hoe 48b or loader 46b and other work attachments 14 needing a hydraulic pressure to power them.

It should be understood, of course, that the foregoing relates to exemplary embodiments of the invention and that modifications may be made without departing from the spirit and scope of the invention as set forth in the following claims.

What is claimed is:

1. A utility tractor comprising:
a tractor frame supported by a plurality of ground wheels, the tractor frame configured to operatively couple a work accessory with the utility tractor, the work accessory having a power connection to couple with one or more of an electric source and a source of pressurized hydraulic fluid;
a hydrostatic pump configured to produce the source of pressurized hydraulic fluid, the hydrostatic pump including an integrally contained transaxle for selectively providing a hydraulic motive force to a driveshaft of the transaxle for each of an opposed pair of drive wheels;
an electric drive motor having an output axially aligned with an input shaft of the hydrostatic pump, the output of the electric drive motor providing a direct drive to the input shaft of the hydrostatic pump that is operative for developing the source of pressurized hydraulic fluid by the hydrostatic pump; and
a plurality of battery compartments disposed about the tractor frame, each of the plurality of battery compartments configured to receive a rechargeable battery to provide an electric source for the electric drive motor and an electric motor for the work accessory.

2. The utility tractor of claim 1, further comprising:
an electrical controller configured to selectively distribute the electric source between the electric drive motor and the work accessory.

3. The utility tractor of claim 2, further comprising
a hydraulically actuated steering linkage coupled with the source of pressurized hydraulic fluid for turning a directional wheel via one of a steering wheel or a directional control lever.

4. The utility tractor of claim 3, further comprising:
an external hydraulic connector disposed at one of a front and a back of the tractor frame, the external hydraulic connector configured to couple with a hydraulic connector of one or more hydraulically actuated work accessories.

5. The utility tractor of claim 4, further comprising:
a hydraulic controller for selectively distributing the source of pressurized hydraulic fluid to the hydraulically actuated steering linkage and one or more hydraulically actuated work accessories.

6. The utility tractor of claim 5, further comprising:
an electrical connector configured to electrically couple the electrical controller with an electrical connector for the work accessory.

7. The utility tractor of claim 1, further comprising:
a battery cart coupled to one or more of a front and a back of the tractor frame, the battery cart configured to receive a plurality of auxiliary rechargeable battery packs.

8. The utility tractor of claim 1, further comprising:
a plurality of batteries carried in the plurality of battery compartments, the plurality of batteries connected in series to drive the electric drive motor at a desired output voltage.

9. A utility tractor comprising:
a tractor frame supported by a plurality of ground wheels, the tractor frame configured to operatively couple a work accessory with the utility tractor;
a hydrostatic pump configured to produce a source of pressurized hydraulic fluid, the hydrostatic pump including an integrally contained transaxle for selectively providing a hydraulic motive force to a driveshaft of the transaxle for each of an opposed pair of drive wheels;
an electric drive motor having an output axially aligned with an input shaft of the hydrostatic pump, the output of the electric drive motor providing a direct drive of the input shaft of the hydrostatic pump that is operative for developing the source of pressurized hydraulic fluid by the hydrostatic pump; and
a plurality of battery compartments disposed about the tractor frame, each of the plurality of battery compartments configured to receive a rechargeable battery to provide an electric source for the electric drive motor and an electric motor for the work accessory.

\* \* \* \* \*